July 31, 1956  H. S. GANO ET AL  2,757,249
POWER CONTROL CENTER
Filed Oct. 24, 1951  2 Sheets-Sheet 1
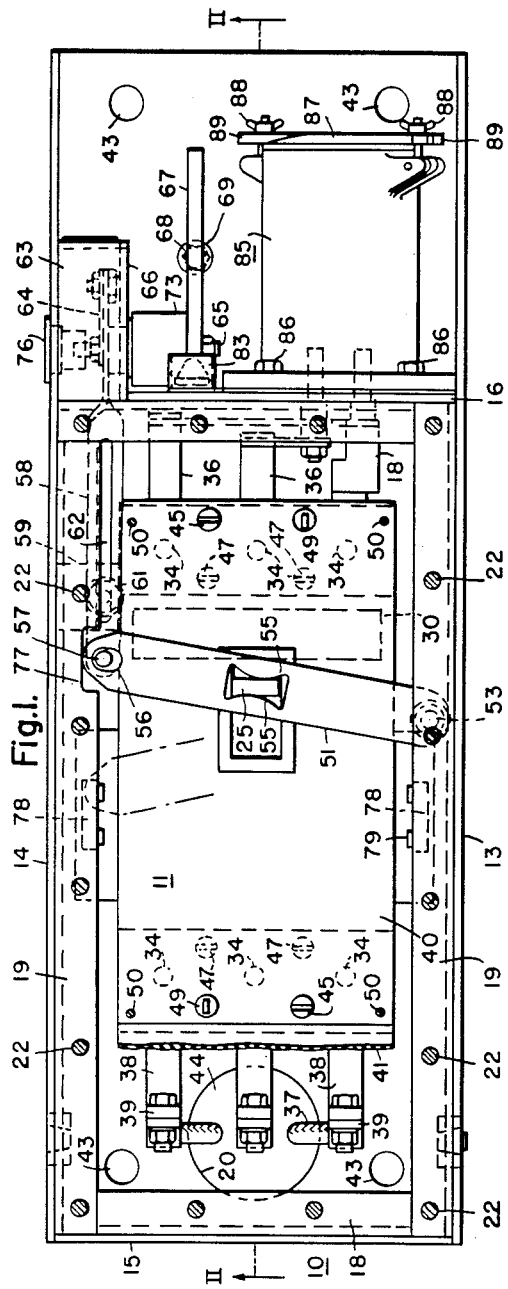
WITNESSES:
E.A.M'Claskey.
Wm. L. Groome
INVENTORS
Harlan S. Gano
and Stephan Miller.
BY Ralph H. Swingle
ATTORNEY

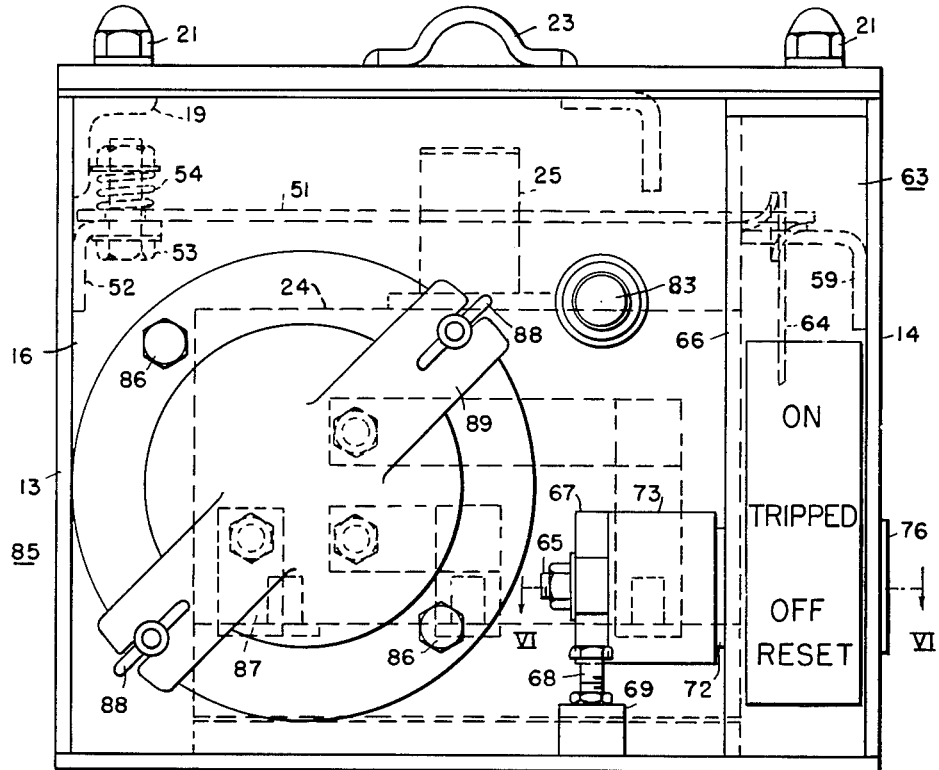

United States Patent Office 2,757,249
Patented July 31, 1956

2,757,249

POWER CONTROL CENTER

Harlan S. Gano and Stephan Miller, Beaver, Pa., assignors to Westinghouse Electric Corporation, East Pittsburgh, Pa., a corporation of Pennsylvania Application October 24, 1951, Serial No. 252,944

8 Claims. (Cl. 200—50)

Our invention relates, generally, to power control centers and, more particularly, to control centers suitable for outdoor service, for example, on piers or docks for controlling the supply of electric power to ships.

When a boat is tied to a dock it is the usual practice to connect electric service cables from the boat to a shore service supply by plugging the boat service cables into cable junction boxes located on the dock. The use of stand-by power permits disengaging the electric generating apparatus on the boat.

Heretofore, the cable junction boxes have been so constructed that one or more boxes may be connected to the shore service supply through a single main circuit breaker, and in the event of a short circuit on any of the circuits from a cable junction box, the main circuit breaker might be tripped thereby interrupting service to all circuits supplied through the main breaker.

An object of our invention is to provide branch circuit protection that will, in the event of an overload or a short circuit, clear the individual branch circuit without opening the main breaker.

Another object of our invention is to provide an externally operable mechanism for operating an enclosed circuit breaker.

A further object of our invention is to so interlock the operating mechanism for an enclosed circuit breaker of the drawout type that the circuit breaker must be in the "off" position before it or its trip unit can be removed from the enclosing housing.

Still another object of our invention is to provide a circuit-breaker housing which is so constructed that chains or ropes cannot become fastened to it.

A still further object of our invention is to protect the operating mechanism for the circuit breaker against injury by chains or ropes, also to prevent unintentional operation of the external operating handle by chains or ropes.

A more general object of our invention is to provide a power-control center which shall be simple and efficient in operation and which may be economically manufactured and installed.

Other objects of our invention will be explained fully hereinafter or will be apparent to those skilled in the art.

In accordance with our invention, a circuit breaker of the drawout type is enclosed in a water-tight housing having an exposed receptacle for receiving a plug on the end of a cable from a ship. An operating yoke which engages the breaker handle is so disposed in the housing that the breaker handle must be in the "off" position before the cover of the breaker may be removed and before the breaker can be removed from the housing. One end of the housing is extended and sloped to protect the receptacle and the external operating handle. When two housings are mounted end-to-end both outside ends are sloped to prevent ropes or chains from being attached to the housings.

For a better understanding of the nature and objects of the invention, reference may be had to the following detailed description, taken in conjunction with the accompanying drawings, in which:

Figure 1 is a view, in plan, of a power control center unit embodying the principal features of the invention, the cover being removed;

Fig. 2 is a view, in section, taken along the line II—II of Fig. 1;

Fig. 3 is a reduced view, showing a side view of two unit housings mounted end-to-end;

Fig. 4 is an enlarged view, in end elevation, of the structure shown in Fig. 1;

Fig. 5 is an enlarged detail view of one of the plug-in contact members for the circuit breaker;

Fig. 6 is an enlarged detail view, in section, of a bearing for a shaft of the operating mechanism, the section being taken along line VI—VI in Fig. 4; and Fig. 7 is a diagrammatic view showing the electrical connections for the control center.

Referring to the drawings and particularly to Figs. 1 and 2, the structure shown therein comprises a water-tight metal enclosure or housing 10 having a circuit breaker 11 mounted therein. The housing 10 is generally rectangular in shape and is constructed of seam-welded heavy steel plate comprising a bottom 12, two side walls 13 and 14, two end walls 15 and 16 and a removable cover 17. As shown, angle members 18 may be disposed across the ends of the housing and similar angle members 19 may be disposed along the sides of the housing to provide an inwardly extending flange around the top of the housing. The cover 17 may be secured in position by cap screws 21 which are threaded onto studs 22 welded onto the flange of the housing 10. Handles 23 may be provided on the cover for lifting it from the housing.

The circuit breaker 11 is preferably of the enclosed type, such as described in Patent No. 2,130,904, issued September 30, 1938, to J. Sandin and having the contact members of the circuit breaker and the operating mechanism enclosed in a housing 24 of molded insulating material. While the use of a circuit breaker is essential to obtain all of the advantages of our invention, certain of the advantages may be obtained if the circuit interrupter is a switch used with or without fuses. The preferred circuit breaker has an operating lever or handle 25 for operating the breaker mechanism which extends through the top 40 of the breaker housing. The circuit breaker may be of the drawout type having disconnecting contact members 26 of the type shown in Fig. 5 to permit the breaker to be removed from the housing 10 without it being necessary to disconnect the conductor cables or copper connections.

As shown in Fig. 5, each one of the disconnecting contacts 26 comprises a stud 27 which is secured in a metal insert 28 molded into the breaker housing 24. A copper strap or conductor 29 is secured to the stud 27, thereby connecting the stud to a breaker terminal. A plurality of contact fingers 31 are disposed around a grooved end of the stud 27 and are retained on the stud by circular springs 32. A spacing ring 33 is provided for retaining the fingers 31 in spaced relation. The fingers 31 engage a stud 34 which is secured in a mounting support 35 disposed at the bottom of the housing 10 for supporting the circuit breaker. A copper strap 36 is connected to the stud 34 for making external electrical connections to the circuit breaker. One set of primary disconnecting contacts is provided at each end of the circuit breaker housing 24. Each set contains two or three contact members, thereby providing the necessary connections for a two or three pole circuit breaker.

Incoming power conductor cables 37 may be brought into the housing 10 through an opening 20 provided in the bottom of the housing near the end 15. The cables 37 may be connected to conductors 38 by connectors 39.

The conductors 38 may be connected to the disconnecting contact members 26 at the one end of the breaker unit in a manner similar to the conductors 36 at the other end of the breaker unit. An insulating barrier 41 may be provided to prevent accidental contact with the conductors 38 and the connectors 39.

As shown in Fig. 2, the housing 10 may be mounted on a cement pier 42 and secured in position by means of bolts which may be embedded in the cement pier and extend through openings 43 provided in the bottom 12 of the housing. Insulating compound 44 may be poured around the conductors 37 to prevent water from entering the housing 10.

The breaker housing 24 may be secured in position in the housing 10 by means of bolts 45 which are threaded into the mounting supports 35. The supports 35 may be secured to mounting pads 46 on the bottom of the housing 10 by bolts 47. Captive bolts 48 having hinged T handles 49 are fastened to the base 60 of the breaker housing 24 for lifting the breaker from the enclosure 10.

As described in the aforesaid Patent No. 2,130,904, the circuit breaker 11 may be provided with a trip device 30 which may be removed from the breaker housing 24 as a unit by removing a cover 40 from the breaker housing. The cover 40 is retained in position by screws 50. Thus, the rating of the circuit breaker may be changed by installing a different trip device 30. The pivoted cross piece of the T handles 49 may be actuated to their vertical position to permit the cover 40 to be removed without removing the bolts 48 from the breaker housing 24. The cover 40 may be removed to permit inspection of the breaker contacts and/or removal of the trip device 30 by removing the screws 50. However, as explained hereinafter, it is necessary for the contacts of the breaker to be open before the cover 40 can be removed. Thus, protection against shock is provided since the breaker contacts are at the line end of the breaker unit.

In order to prevent the contact members of the primary disconnecting contacts 26 from being separated or the trip device 30 removed while conducting current, provision is made for so interlocking the operating mechanism for the circuit breaker with the housing structure that the circuit breaker 11 cannot be removed from the housing 10 or the cover 40 removed from the breaker housing 24 while the contact members of the circuit breaker are closed. The handle or lever 25 of the circuit breaker is actuated by an interlocking yoke 51 which extends across the top of the housing 24 of the circuit breaker 11 and is pivotally attached at one end to a bracket 52 by means of a bolt 53. The bracket 52 may be secured to the side wall 13.

As shown in Fig. 4, the diameter of the hole in the yoke 51 for the bolt 53 is larger than the bolt and a spring 54 may be provided on the bolt 53 between the yoke 51 and the nut for the bolt 53 to permit the other end of the yoke 51 to be raised for a purpose which will be explained hereinafter. The yoke 51 has an opening having curved sides 55 for engaging the circuit-breaker handle 25. The end of the yoke opposite the bolt 53 has an opening 56 therein for receiving a pin 57 which is carried by a slidable bar or link 58. The link 58 is supported by a bracket 59 secured to the side wall 14 of the housing 10. A bolt 61 extends through the bracket 59 and a slot 62 in the link 58.

As shown, the end of the link 58 opposite the pin 57 is twisted at right angles to the portion of the link containing the slot 62 and extends through the end wall 16 of the housing 10 into a small water-tight enclosure 63. This end of the link 58 is connected to one end of a crank arm 64, the other end of which is secured to a shaft 65 rotatably mounted in a side wall 66 for the enclosure 63. An actuating handle 67 is secured to the shaft 65 externally of the enclosure 63 and the housing 10.

As shown most clearly in Figs. 2 and 4, the handle 67 may be actuated to operate the circuit-breaker mechanism. The handle may be moved from the "off" position to the "on" position to close the circuit breaker and it may be moved from the "on" position to the "off" position to manually open the circuit breaker. If the circuit breaker is automatically tripped by an overload current, the handle 67 is actuated to the "tripped" position. The handle may be then moved to the "reset" position to permit normal operation of the breaker. A bolt 68, which is threaded into a pad 69 on the bottom 12 of the housing 10, is provided for adjustably limiting the downward travel of the handle 67.

As shown most clearly in Fig. 6, the rotary shaft 65 is mounted in a water-tight manner in a bearing 71 which is disposed in a bearing hub 72 mounted in the side wall 66. The bearing bushing 71 is preferably of phenolic insulating material to prevent corrosion of the rotatable bearing surfaces due to electrolytic action. A hub cap 73 encloses a leather washer 74 disposed at the outer end of the bearing hub 72 to prevent moisture from entering the bearing. A spring washer 75 is disposed on the shaft 65 between the wall 66 and the bearing 71 to compensate for wear of the leather washer 74. The end of the shaft 65 opposite the end to which the handle 67 is attached is mounted in a bearing 76 disposed on the side wall 14 of the housing 10.

As shown most clearly in Fig. 1, a notch 77 is provided in the flange 19 of the housing 10 to permit the one end of the yoke 51 to be raised when the breaker handle 25 is in the "off" position. Thus, the end of the yoke 51 may be raised to clear the pin 57 and the breaker handle 25 after which the yoke may be swung around to clear the breaker housing 24, thereby permitting the cover of the breaker enclosure to be removed and permitting the entire breaker to be removed from the housing 10.

As shown by the broken lines in Fig. 1, the end of the yoke 51 having the opening 56 for the pin 57 is underneath the flange 19 when the breaker handle 25 is in the "on" position. Thus, the yoke 51 cannot be raised to clear the pin 57 and the breaker handle 25 when the breaker is closed. It can be raised only when the end of the yoke is beneath the notch 77 in the flange 19, at which time the breaker handle is in the "off" position. In this manner the breaker 11 is prevented from being removed from the housing 10 while the contact members of the breaker are closed.

In order to prevent condensation in the housing 10, resistors 78 are mounted inside the housing on insulating supports 79 attached to mounting pads 81 on the bottom 12 of the housing. As shown in the diagram in Fig. 7, the resistors 78 are energized through an auxiliary switch 82 on the circuit breaker 11 when the contact members of the circuit breaker are open. Thus, heat is supplied to prevent condensation when the breaker is open. When the breaker is closed, sufficient heat is developed by the load current to prevent condensation. A pilot light 83, which is mounted on the end wall 16 outside of the housing 10, is provided for indicating when the resistors 78 are energized and the breaker is open. A terminal board 84 is provided inside the housing 10 for making the connections to the resistors 78.

As explained hereinbefore, the power-control center is utilized to permit cables from ships to be connected to a shore service supply while a ship is anchored at a pier or dock. A receptacle 85 is mounted on the end wall 16 by means of bolts 86 for receiving a plug provided on the end of a cable from a ship. The receptacle 85 has a cover 87 which may be removed by loosening wing nuts 88 on clamps 89. The receptacle 85 is electrically connected to the circuit-breaker terminals by conductors 90 which are connected to the conductors 36 which, as explained hereinbefore, are connected to the contact stud 34 of the disconnecting contacts 26. In this manner, power may be supplied to a ship by plugging the ship cable into the receptacle 85 and closing the circuit breaker 11.

In order to protect the handle 67 and the receptacle 85 from injury by external objects, such as ropes or cables, the bottom 12 and the sides 13 and 14 of the housing 10 are extended beyond the end wall 16, thereby providing a semi-enclosure for these members. Since the top is left open the handle and the receptacles are readily accessible at all times.

In order to prevent ropes or chains from being attached to the housing, the ends of the extended side members 13 and 14 are so sloped that the tops of the side members are shorter than the bottoms. As shown in Fig. 3, two housing units 10 may be disposed end-to-end with the end walls 15 abutting each other and the sloping ends of the side walls disposed at the outer ends, thereby providing sloping surfaces at both exposed ends which make it practically impossible to attach a rope or chain to the structure.

From the foregoing description, it is apparent that we have provided a power-control center which may be installed at any desired location on the pier or dock and may be utilized to facilitate the supplying of power to ships when they are anchored at the dock. The circuit breaker within the control center provides full protection for the power cables and a convenient means for disconnecting the power when desired. The operating mechanism for the circuit breaker is so interlocked with the enclosure that the breaker can be removed from the enclosure only when the operating handle of the circuit breaker is in the "off" position. The housing unit is so constructed that it is prevented from possible injury by attaching ropes or cables to it for the purpose of tying the ships to the dock.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A control center comprising a generally rectangular housing having an inwardly extending flange at the top of the housing, a cover removably attached to the flange, a circuit breaker disposed in the housing and having an operating handle, a yoke having one end pivotally mounted in the housing between the breaker and the flange, said yoke having an opening therein with curved sides engaging the breaker handle, said flange having a notch therein, the other end of said yoke engaging said flange and being passable through said notch only when the breaker handle is in a predetermined position to permit removal of the breaker from the housing, a shaft rotatably mounted in the housing and having an external operating arm apart from the housing cover, a crank arm connected to the shaft, and a link connecting the crank arm to the yoke to operate the breaker, said housing cover being removable independently of said yoke and said external operating arm.

2. A control center comprising a housing having an inwardly extending flange at the top of the housing, a cover removably attached to the flange, a circuit breaker disposed in the housing and having an operating handle, a pivoted yoke extending across the breaker between the breaker and the flange and engaging the breaker handle and the flange, said flange having a notch therein, the end of said yoke opposite its pivot being movable through said notch to permit removal of the breaker from the housing only when the breaker handle is in the "off" position, and operating means apart from the housing cover and accessible externally of the housing and connected to the yoke for operating the breaker handle, said housing cover being removable independently of said yoke and said operating means.

3. A control center comprising a generally rectangular housing having an inwardly extending flange at the top of the housing, a cover removably attached to the flange, a circuit breaker unit disposed in the housing and having an operating handle for opening and closing the breaker, frictionally engageable terminal members in the housing, cooperating disconnect contact members on the breaker unit engaging the terminal members in the housing to establish a circuit through the breaker, a yoke extending across the breaker unit and engaging the breaker handle to operate the breaker, said yoke cooperating with the flange to permit removal of the breaker unit to separate the disconnect contact members from the terminal members only when the breaker is open to interrupt the circuit through the breaker, and actuating means accessible externally of the housing and connected to the yoke to operate the breaker.

4. A control center comprising a housing having an inwardly extending flange at the top of the housing, a cover removably attached to the flange, a circuit breaker unit disposed in the housing and having an operating handle for opening and closing the breaker, frictionally engageable terminal members in the housing, cooperating disconnect contact members on the breaker unit engaging the terminal members in the housing to establish a circuit through the breaker, a yoke extending across the breaker unit and engaging the breaker handle to operate the breaker, said yoke cooperating with the flange to permit removal of the breaker unit to separate the disconnect contact members from the terminal members only when the breaker is open to interrupt the circuit through the breaker, mounting studs threaded into the housing for securing the breaker in the housing, said studs being retained with the breaker for lifting the breaker from the housing, and an externally accessible lever connected to the yoke to operate the breaker when it is in the housing.

5. A control center comprising a generally rectangular housing having opposite sides extending beyond one end wall, a circuit breaker disposed in the housing and having an operating handle, an actuating handle disposed at one end of the housing externally of the housing between said extended sides, and linkage means connecting the actuating handle to the breaker handle, the opposite sides of the housing at one end extending beyond and above the actuating handle to protect said handle, said extended sides having sloping ends extending from the bottom of the housing to the top of the housing to prevent attaching ropes around the housing.

6. A control center comprising a generally rectangular housing having opposite sides extending beyond one end wall and an inwardly extending flange at the top of the housing, a cover removably attached to the flange, a circuit breaker disposed in the housing and having an operating handle underneath the cover, an actuating handle disposed at one end of the housing externally of the housing between said extended sides, linkage means connecting the actuating handle to the breaker handle, the opposite sides of the housing at one end extending beyond and above the actuating handle to protect said handle, the ends of said extended sides being sloped from the bottom of the housing to the top of the housing to prevent attaching ropes around the housing.

7. A control center comprising a generally rectangular housing having opposite sides extending beyond one end wall and an inwardly extending flange at the top of the housing, a cover removably attached to the flange, a circuit breaker disposed in the housing and having an operating handle underneath the cover, an actuating handle disposed at one end of the housing externally of the housing between said extended sides, linkage means connecting the actuating handle to the breaker handle, the opposite sides and the bottom of the housing at one end extending beyond the actuating handle to protect said handle, said extended sides being shorter at the top of the housing than at the bottom of the housing to prevent attaching ropes around the housing, a rotatable shaft extending through the housing for the actuating handle, and a bearing for the shaft disposed in one of said extended sides.

8. In a control center, in combination, a housing having an inwardly extending flange on one side of the housing, a cover removably attached to the housing, a circuit-breaker unit removably disposed in the housing and having an operating lever, a cover removably attached to the circuit-breaker unit, a yoke pivotally mounted in the housing between the breaker cover and the flange and engaging the breaker lever, said flange having a notch therein, one end of said yoke being passable through said notch only when the operating lever is in the "off" position to permit removal of the breaker cover from the breaker unit, actuating means on the housing and apart from the cover and accessible externally of the housing and connected to the yoke to operate the breaker, and lifting means extending through openings in the breaker cover into the breaker unit for lifting the breaker unit from the housing only after said yoke has been passed through the notch in the flange, said lifting means having hinged handles passable through the openings in the breaker cover to permit the breaker cover to be removed from the breaker unit only after said yoke has been moved through said notch, said housing cover being removable independently of said yoke and said actuating means.

References Cited in the file of this patent

UNITED STATES PATENTS

| | | |
|---|---|---|
| 1,687,165 | Leppert | Oct. 9, 1928 |
| 1,702,416 | Rutter et al. | Feb. 19, 1929 |
| 1,875,225 | Despard | Aug. 30, 1932 |
| 1,891,939 | Mauger | Dec. 27, 1932 |
| 1,924,691 | Lofgren | Aug. 29, 1933 |
| 1,971,990 | Reynolds et al. | Aug. 28, 1934 |
| 2,087,589 | Bonnell et al. | July 20, 1937 |
| 2,178,083 | Sandin | Oct. 31, 1939 |
| 2,240,922 | Bissell | May 6, 1941 |
| 2,250,977 | Walker | July 29, 1941 |
| 2,265,030 | Dorfman | Dec. 2, 1941 |
| 2,329,442 | Popp | Sept. 14, 1943 |
| 2,368,679 | Popp | Feb. 6, 1945 |
| 2,441,465 | Bauroth | May 11, 1948 |
| 2,447,749 | Hallett | Aug. 24, 1948 |
| 2,450,705 | Williams | Oct. 5, 1948 |
| 2,526,901 | Robbins | Oct. 24, 1950 |
| 2,530,548 | Stanley | Nov. 21, 1950 |
| 2,566,039 | Sigmon, Jr. | Aug. 28, 1951 |
| 2,595,102 | Santangelo | Apr. 29, 1952 |

FOREIGN PATENTS

| | | |
|---|---|---|
| 408,130 | Germany | Mar. 3, 1923 |